July 17, 1951 R. CRANE, JR 2,561,182
SHARP FREQUENCY DISCRIMINATOR
Filed May 26, 1948 3 Sheets-Sheet 1

INVENTOR
ROBERT CRANE, JR.
BY
ATTORNEY

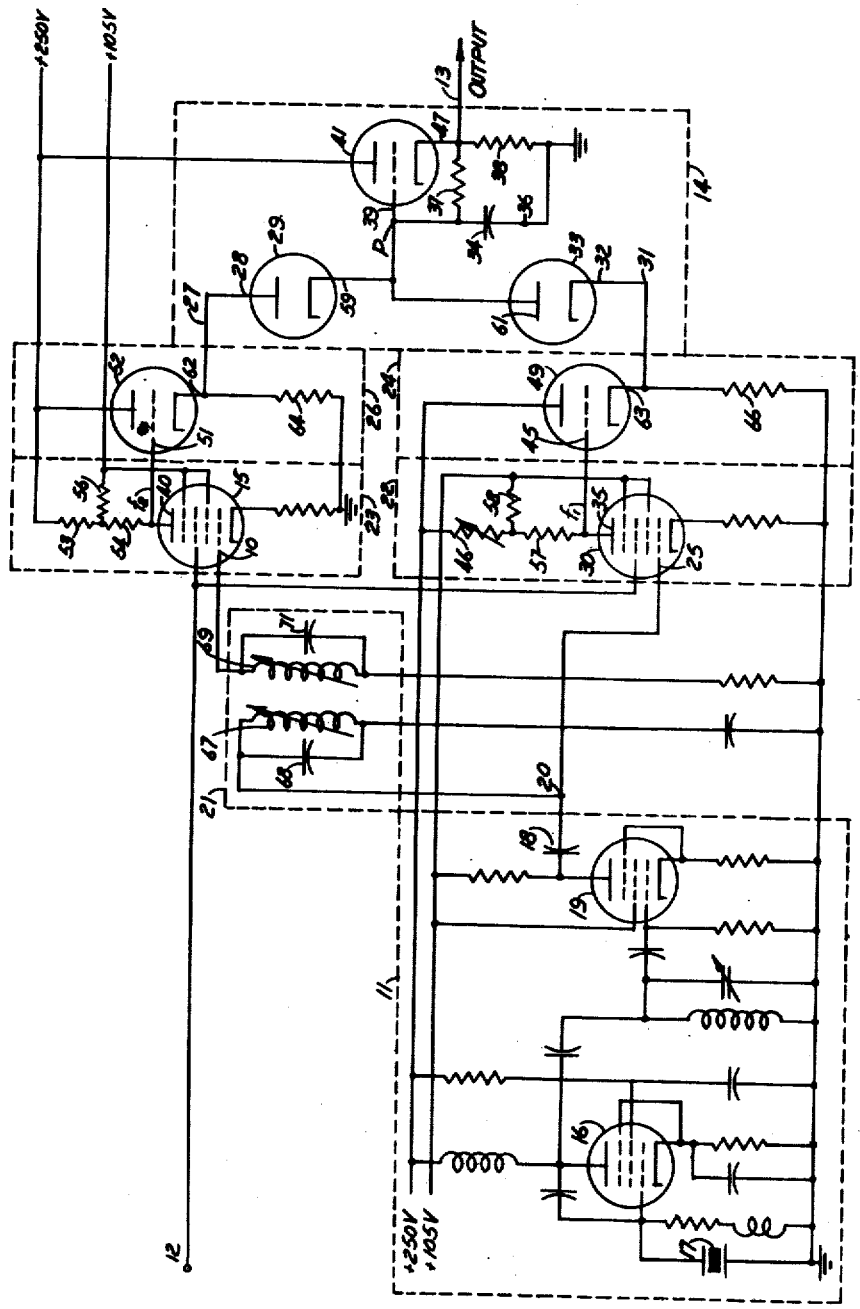

July 17, 1951  R. CRANE, JR  2,561,182
SHARP FREQUENCY DISCRIMINATOR
Filed May 26, 1948  3 Sheets-Sheet 3

INVENTOR
ROBERT CRANE, JR.
BY
ATTORNEY

Patented July 17, 1951

2,561,182

UNITED STATES PATENT OFFICE 2,561,182

SHARP FREQUENCY DISCRIMINATOR

Robert Crane, Jr., Begg Drive, N. Y., assignor to General Precision Laboratory Incorporated, a corporation of New York Application May 26, 1948, Serial No. 29,393

9 Claims. (Cl. 172—245)

This invention relates to a sharp frequency discriminator for the accurate comparison of the frequencies of two alternating current signals.

An object of this invention is electronically to compare an alternating current signal of varying frequency with a signal of standard frequency and to ascertain with an accuracy hitherto unobtainable whether the frequency of the signal of varying frequency is above or below the frequency of the reference signal.

In general, the equipment comprises an accurate electrical local oscillator generating a signal of any frequency desired for the immediate purpose and within the range of usefulness of thermionic tubes. The equipment also contains means for receiving and mixing therewith another or input electrical signal of a frequency which may vary fortuitously or be varied purposefully, and of which it is desired to ascertain whether the frequency is above or below that of the signal generated by the local oscillator. By a phase-sensitive detector the two signals are compared and the sense is indicated when they are unlike in frequency.

Instead of this equipment producing simply an indication, it may actuate feedback equipment to maintain the frequency of the electrical signal input the same as the frequency of the signal of the local oscillator within close limits, or the feedback mechanism can be calibrated to indicate or record the movement thereof for use in industrial measurement. Applications might include the automatic recording or control of the frequency of a signal in test or industrial equipment where great precision is demanded, as for instance, in the continuous measurement of exceedingly small fluctuations in the dielectric constant of a material.

Circuits heretofore used for frequency discrimination, such as that of the coupled-circuit discriminator, have not given the sense of an indicated frequency difference. They have depended for sharpness of tuning on the slope of the phase curve of an inductance-capacity oscillating circuit, the steepness of which was limited by the minimum attainable damping, so that the figure of merit designated Q for this steepness could not practically be brought above 200. Moreover, the center frequency depended on the natural period of an inductance-capacity circuit and therefore could not be maintained with the greatest accuracy. When circuits heretofore available for the purposes of this invention included iron core transformers in the detection circuit they were inherently incapable of detecting signals having frequencies near zero.

The instant circuit, however, has an equivalent Q which can be made as high as 400,000, and its center frequency is that of the signal generated by local oscillator which can be of the exceedingly accurate and stable oscillating crystal type, giving it an absolute accuracy and a sensitivity to frequency difference of a higher order of magnitude than available heretofore. It can discriminate beat frequencies approaching zero beat to a closeness heretofore unobtainable.

In references in the following detailed description to the drawing,

Figure 2 shows schematically an embodiment of this invention.

Figure 1:
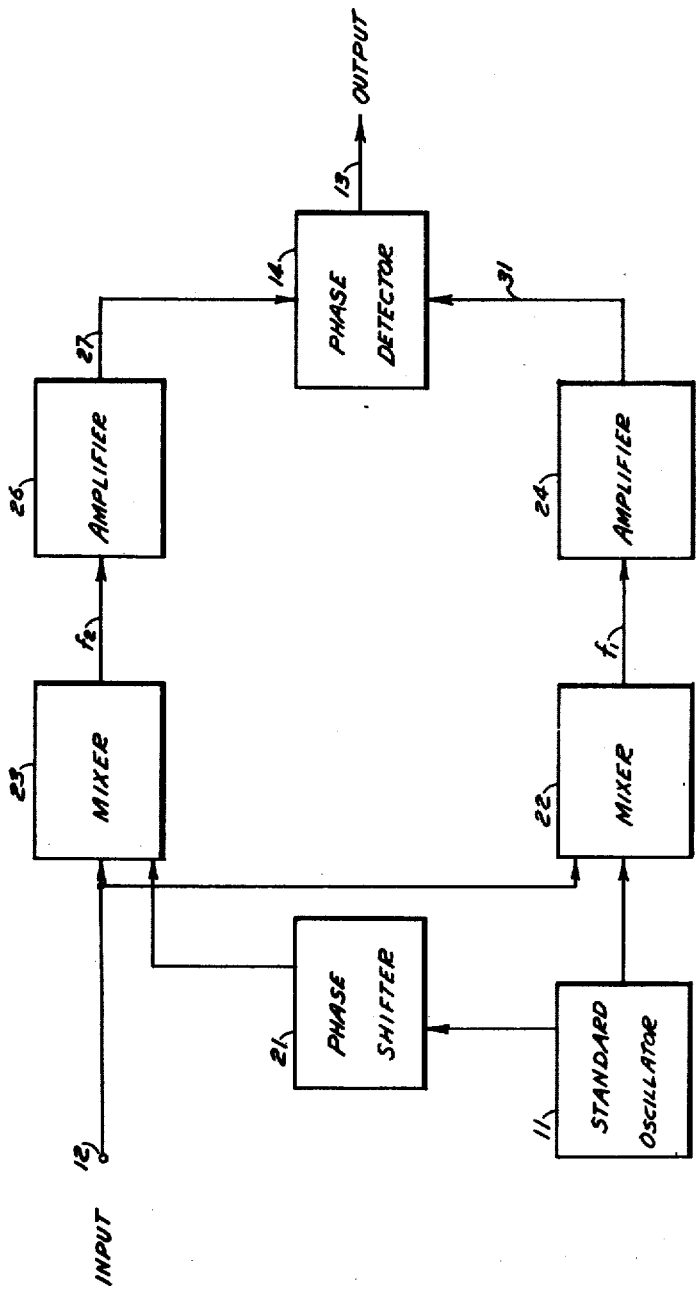
Figure 1 is a block diagram of an embodiment of this invention.

Referring to Fig. 1, a standard oscillator 11 is provided for comparison of the frequency of its signal output with the frequency of oscillations of the signal fed into the system at terminal 12. One portion of the signal output of the oscillator is fed to mixer 22 and another portion is fed to phase shifter 21 and thence to mixer 23. One portion of the signal received at terminal 12 is fed to mixer 23 and another portion to mixer 22. The mixing in mixer 22 of the signals derived from oscillator 11 and from input terminal 12 results in the production of a beat frequency signal, $f_1$, which is the difference frequency of the two original signals. Similarly, the mixing in mixer 23 of the two infed signals results in a signal having a difference beat frequency $f_2$. The two beat frequency signals $f_1$ and $f_2$ are identical in frequency, but differ in phase by the amount of shift produced by phase shifter 21, for the reasons as explained in Ultra-High-Frequency Techniques, by J. G. Brainerd, 1st Edition, page 231.

The beat frequency phase shift sense or sign will depend on whether the standard oscillator signal frequency, $w_o$, is greater or less than the unknown signal frequency, $w_s$, as follows: As the above reference shows, the expression for the beat difference frequency voltage is $$E_{f_2} = A \cos\left[(w_o - w_s)\, t + \theta\right]$$

where $A$ is a constant, $t$ is time and $\theta$ is the phase shift produced by phase shifter 21. If the standard oscillation signal frequency, $w_o$, be larger than the unknown signal frequency, $w_s$, the expression is as given, the "$+\theta$" indicating a positive phase shift in the beat frequency $f_2$, as compared with $f_1$, of exactly the same amount as produced by phase shifter 21. But if the standard oscillator frequency $w_o$, be smaller than the unknown frequency, $w_s$, algebraic manipulation of the equation results in $$E_{f_2} = A \cos [(w_o - w_s) t - \theta]$$

indicating that a negative phase shift of the same amount as before is produced in the beat frequency $f_2$ as compared with $f_1$.

The beat frequency output signal $f_2$ of mixer 23 is fed through amplifier 26 to phase detector 14, and the beat frequency output signal $f_1$ of mixer 22 is fed through amplifier 24 to the same phase detector 14. The phase detector compares the two input beat frequency signals, observes the relation of their phases, and if less than 90° difference measures the amount. Its output containing all of this information appears at lead 13. Thus the output at lead 13 will indicate whether the input signal frequency $w_s$ is greater or less than the reference signal frequency $w_o$ of standard oscillator 11, and when the difference between $w_s$ and $w_o$ is small, the output will also indicate the amount of difference.

The manner in which this is accomplished is illustrated in Fig. 2. Standard oscillator 11 may consist of any of the well-known oscillator circuits stable enough for use as a reference standard of frequency, and may or may not include an amplifier. As a preferred embodiment, a pentode crystal oscillator tube 16 is employed, followed by a buffer pentode amplifier tube 19. The oscillator may be designed to operate on the desired comparison frequency, or on a harmonic thereof to prevent the possibility of pulling the input signal frequency $w_s$ into step with it when the two frequencies are nearly alike. It even may be desirable in some cases to compare a harmonic of the unknown signal frequency with a harmonic of the standard signal frequency, and for an illustration of a preferred embodiment of the invention this method of operation is chosen, in which the second harmonic of the unknown signal frequency $w_s$ is compared with the third harmonic of the standard oscillator signal frequency, $w_o$.

The output of oscillator 11 through blocking condenser 18 is fed to mixer 22 and through phase shifter 21 to mixer 23. The function of phase shifter 21 is to produce a 90° phase lag, so that the potential fed to control grid 10 of mixer tube 15 will lag by 90° the potential of point 20, which is fed to control grid 25 of mixer tube 30. Any of the numerous well-known phase-shifting circuit arrangements may be used here for this purpose, but it is preferred to use a combination of two coupled resonant circuits because it produces a 90° lagging phase shift with negligible loss. In Fig. 2 the combination of variable inductance 67 and fixed condenser 68 is tuned to the frequency of the signal generated by oscillator 11, as is also the combination of variable inductance 69 and fixed condenser 71. The two inductances are loosely coupled. The voltage induced across inductance 69 and presented to grid 10 of tube 15 then lags by 90° the voltage applied across inductance 67 by tube 19.

The two beat frequency signals, $f_1$ produced at plate 35 of mixer tube 30 and $f_2$ produced at plate 40 of mixer tube 15, are identical in frequency but differ in phase as heretofore stated, the phase of $f_2$ leading that of $f_1$ by 90° when $w_s$ is a frequency lower than $w_o$, and conversely the phase of $f_2$ lagging that of $f_1$ by 90° when $w_s$ is higher than $w_o$. This statement is correct even though the difference between $w_s$ and $w_o$ is very small. That is, if $w_s$ increases and becomes closer and closer in frequency to $w_o$ the phase shift sense remains the same, even though the frequency of $w_s$ becomes infinitely close to that of $w_o$. As the two frequencies become the same and $w_s$ becomes greater than $w_o$, the phase shift sense instantaneously shifts from $+90°$ to $-90°$ when the frequency difference goes through zero.

Beat frequency signals $f_1$ and $f_2$ may be led directly to a phase detector, but it is preferred to amplify each signal first. Therefore signal $f_1$ is led from plate 35 of mixer 30 to control grid 45 of amplifier tube 49 in amplifier stage 24, and signal $f_2$ is led from plate 40 of mixer 15 to control grid 51 of amplifier tube 52 in amplifier stage 26. In order to present the desired low impedance to the following detector it is preferred that amplifiers 24 and 26 be of the cathode follower type. In each amplifier, positive grid bias is furnished through the plate supply of the preceding tube. The plate supply for tube 15 is drawn through a voltage divider consisting of resistors 53, 54 and 56, and the supply for tube 30 is drawn through resistors 46, 57 and 58, resistor 46 being variable in order to adjust the relative operating potentials of the tubes constituting the phase detector as well be described later. The outputs of amplifiers 24 and 26 are taken from cathodes 63 and 62 respectively.

These outputs, through leads 31 and 27, feed a phase detector whose function is to discriminate between a leading and a lagging phase of the signal $f_2$ as compared with the phase of signal $f_1$. This discrimination is exceedingly accurate. For instance, tests on a device so constructed showed ability to discriminate between a 4.75 megacycle reference frequency and another frequency differing by only two cycles, that is, having a frequency difference of only .00005%.

The phase detector 14 includes two rectifying elements which may be of any type, connected in aiding relationship, but it is preferred to employ diode thermionic tubes as illustrated in Fig. 2, connected in a circuit which comprises lead 27 from cathode follower amplifier 26 to plate 28 of diode 29, cathode 59, plate 61 of diode 33, cathode 32 and output lead 31 of cathode follower amplifier 24. The common point of connection of the two diode tubes, P, is connected through condenser 34 to ground. It is necessary that the detecting diodes be followed by impedance-reducing equipment, because the impedance of point P, the diode output point, must be kept very high for proper operation on a small frequency difference, yet the output, to be useful must be capable of actuating indicating or control equipment of much lower impedance than this. It is preferred that such impedance-reducing equipment be embodied in a cathode follower amplifier stage. Therefore point P is connected also to control grid 39 of cathode follower amplifier tube 41, employing cathode resistor 38 and grid leak 37. Output is taken from cathode 47 through lead 13.

In the absence of a signal frequency $w_s$, the bias potential of common point P is the average of that of leads 27 and 31, which have the potentials of cathodes 62 and 63 of amplifier tubes 52 and 49 respectively. These in turn are dependent on the cathode resistor currents and voltage drops in resistors 64 and 66, which are controlled by the biases of their respective control grids 51 and 45. These, as stated above, are dependent on the plate voltages of tubes 15 and 30, with variable resistor 46 provided to adjust the voltage of tube 30. Therefore by the adjustment of this resistor the relative biases and cathode currents of tubes 52 and 49 can be adjusted, thereby controlling the relative bias potentials of leads 27 and 31 and consequently the average thereof or the potential of point P in absence of a signal.

Figure 4:
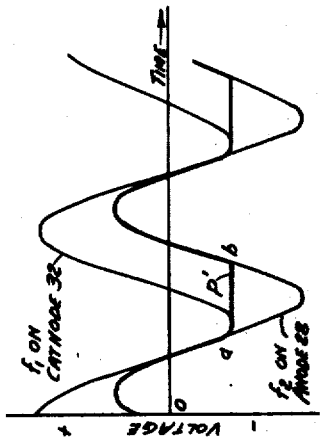
Figure 3:
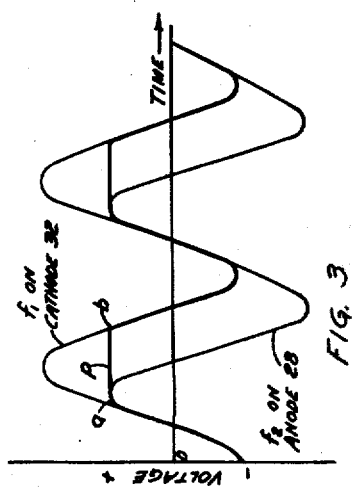

The potential of point P in the absence of a signal is indicated in Figs. 3 and 4 by the horizontal axis of zero voltage. When a signal frequency $w_s$ is impressed at terminal 12, signals $f_1$ and $f_2$ appear at the grids 45 and 51 of amplifier tubes 49 and 52, are transformed and appear on leads 31 and 27 and on cathode 32 and plate 28 of the detector. These signals also differ from each other by their biases, which is indicated in Figs. 3 and 4 by the vertical separation between $f_1$ and $f_2$ in each figure. This separation, or difference in bias, is adjusted as heretofore stated by use of resistor 46, and is preferably made so that, with the intensity of oscillator 11 output as employed, the bias and amplitude relationships will be as shown in Figs. 3 and 4. In any case, adjustment must be so that beat frequency peaks at plate 28 and cathode 32 will be greater than the respective biases at those locations.

In operation, when the phase of signal $f_2$ leads that of $f_1$, the voltages at anode 28 and cathode 32 are as depicted in the graph of Fig. 3. Starting at zero time, the voltage at cathode 32 rises as does that at anode 28, causing the voltage of point P to rise with their average potential. This continues to point $a$ in Fig. 3, when the voltage of anode 28 turns down so that the potential of point P no longer can rise. But condenser 34, Fig. 2, having been charged, maintains the potential at P except as it leaks through resistors 37 and 38. The potential at P therefore remains relatively constant between points $a$ and $b$, Fig. 3, after which it falls with that of cathode 32, condenser 34 discharging through to diode 33 until the charge potential meets the rising potential of anode 28 and again rises with it, repeating the cycle.

Fig. 4 shows $f_2$ lagging $f_1$ and gives the resultant voltage P' at point P, Fig. 2. In each case inspection shows that the voltage at point P, Fig. 2, dwells more on one side of zero than on the other, in other words, a direct current component is present at point P in addition to the alternating component. Moreover, when $f_2$ leads $f_1$ the direct component is positive, and when $f_2$ lags $f_1$ it is negative.

Figure 5:
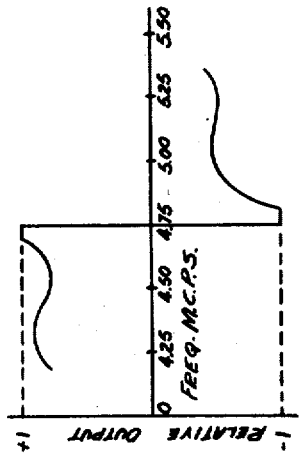
Figs. 3, 4, 5 and 6 show graphically the relations of voltage with time and frequency in the system of this invention.
Figure 6:
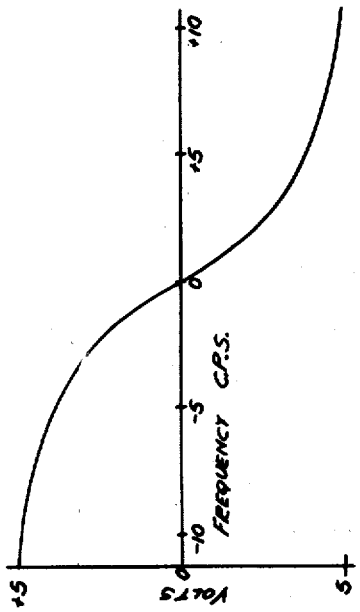

Experiment and theory show the relationship under one set of conditions to be as given in Figs. 5 and 6, illustrating graphically the sensitivity to frequency difference change in sense which the combination of phase sensing detector 14 with the cooperating equipment may have. This sensitivity is exhibited in Fig. 6, which is a representation of the center portion of the graph of Fig. 5 on a greatly expanded scale, by the steepness of slope of the curve where it crosses the zero line. The sensitivity is greatly influenced by the sizes of condenser 34 and of resistor 37; and it has been found advantageous to make condenser 34 approximately 750 $\mu\mu f.$ and resistor 37 approximately 10 megohms. With these values, for all expected values of input frequency differences, operation will be effective and as described. For the largest values of input frequency differences, however, action will be improved by the insertion at point 36, in series with condenser 34, of any conventional constant-impedance network, such as, very simply, a 50 $\mu\mu f.$ condenser parallelled by a 2000 ohm resistor. With appropriate values for the use intended of all of the above-mentioned condensers and resistances, the potential at point P, Fig. 2, will be maintained during the time represented by line $ab$ in Figs. 3 and 4, so that line $ab$ will be horizontal or nearly so. This in turn means that for the received range of frequency differences the peculiar phase-sensing property of detector 14 is both effective and efficient.

Figs. 5 and 6 indicate that when the reference frequency is 4.75 megacycles, full detector output voltage is obtained with but a 12-cycle difference between the reference signal frequency, $w_o$, and the variable signal frequency $w_s$. Moreover, the potential of the output signal at lead 13 will be 5 volts for 12 cycles difference between the two prime signal frequencies $w_o$ and $w_s$. Thus a very strong output signal is secured for even exceedingly small relative differences in the prime frequencies. Fig. 6 also illustrates that, as before stated, beat frequencies indefinitely close to zero can be discriminated and their sense indicated, the practical limitation being set by the stability of the reference oscillator, the design of which is not a part of this invention.

Figure 7:
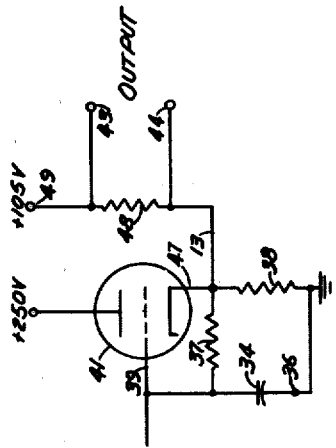
Figure 7 shows schematically an alternative output circuit.

In the system as represented by the circuit of Fig. 2, the output obtained at lead 13 is always of the same sign, the value thereof varying from a maximum to a minimum as indicated by the graphs of Figs. 5 and 6. The average of this maximum and minimum, represented by the X axis in these graphs, constitutes the value of output which establishes that the standard signal frequency $w_o$ and the input signal frequency $w_s$ are exactly equal. When the output is a maximum it is indicated that the standard signal frequency $w_o$ is greater than the input signal frequency $w_s$ and conversely when the output is a minimum it is inidcated that the standard signal frequency is less than the input signal frequency.

Where it may be desirable to obtain a direct current output which has zero potential when the standard and input signal frequencies are in exact agreement and which has one sense when the standard signal frequency is greater than the input signal frequency and the opposite sense when the standard signal frequency is less than the input signal frequency, the modified output circuit of Fig. 7 may be used to advantage.

In this modified portion of the output circuit the input circuit of the cathode follower 41 is the same as illustrated and previously described in connection with Fig. 2. The output circuit, however, is modified by the inclusion of a resistor 48 in a circuit connecting the lead 13 to a source of positive voltage indicated by the terminal 49. The value of this positive voltage is made such that when the standard signal frequency and the input signal frequency are exactly equal, zero output is obtained at terminals 43 and 44 connected to opposite ends of the resistor 48. As an example, 105 volts at the terminal 49 has been used with success. This arrangement has the effect of making the X axis of the graphs of Figs. 5 and 6 coincident with zero potential so that those portions which extend above the axis represent a direct current output which is, say, positive and those below the axis a negative potential.

While in describing the instant invention the standard oscillator is indicated as a local oscillator and a physical part of the equipment located at the point of use it will be recognized that it may well be located at some remote point, the standard signal frequency being obtained therefrom by the usual radio propagation. For example, the standard carrier and audio frequencies of the Bureau of Standards Station WWV may be used as the standard frequency since the signals transmitted by this station are extremely accurate.

What is claimed is:

1. A frequency discriminator comprising, a source of signals of known frequency, a source of signals of unknown frequency, a first mixer means for obtaining a first beat frequency signal from said known frequency signal and said unknown frequency signal, a second mixer means for obtaining a second beat frequency signal from said known frequency signal and said unknown frequency signal means for causing one of said beat frequency signals to lag or lead the other of said beat frequency signals depending on the relative frequency values of said known and unknown signals, phase-sensitive detector means including a pair of serially connected diodes, a condenser connected between the common juncture of said serially connected diodes and ground, a first thermionic amplifier including an unbypassed cathode resistor having its input coupled to the output of said first mixer means, a direct connection from the cathode of said first amplifier to the anode of one of said pair of diodes, a second thermionic amplifier including an unbypassed cathode resistor having its input coupled to the output of said second mixer means, a direct connection from the cathode of said second amplifier to the anode of the other of said pair of diodes, and means for impressing differential initial biases on the inputs of said first and second amplifiers.

2. A frequency discriminator according to claim 1 in which the output circuit for said phase-sensitive detector means comprises a thermionic tube having at least an anode, cathode and control grid, a connection between said control grid and the common juncture of said serially connected diodes and an unbypassed resistor connected between said cathode and ground.

3. A frequency discriminator according to claim 2 in which the output circuit for said discriminator is connected across the unbypassed cathode resistor of said output amplifier.

4. A frequency discriminator comprising, a source of signals of known frequency, a source of signals of unknown frequency, a first mixer means for obtaining a first beat frequency signal from said known frequency signal and said unknown frequency signal, a second mixer means for obtaining a second beat frequency signal from said known frequency signal and said unknown frequency signal, phase shifting means interposed between one of said signal sources and one of said mixer means for causing one of said beat frequency signals to lag or lead the other of said beat frequency signals depending on the relative frequency values of said known and unknown signals, a first amplifier tube coupled to the output of said first mixer means, a second amplifier tube coupled to the output of said second mixer means, means for impressing different initial biases on the inputs of said first and second amplifier tubes, a pair of serially connected rectifiers respectively connected to the output circuits of said first and second amplifiers, and a condenser connected between the common juncture of said rectifiers and ground.

5. A frequency discriminator according to claim 4 including a third amplifier tube having at least an anode, cathode and control grid, a connection between said control grid and the common juncture of said serially connected rectifiers, an unbypassed resistor connected between said cathode and ground and an output circuit connected across said unbypassed cathode resistor.

6. A frequency discriminator according to claim 10 including a third amplifier tube having at least an anode, cathode and control grid, a connection between said control grid and the common juncture of said serially connected rectifiers, an unbypassed resistor connected between said cathode and ground, a second resistor connected between said cathode and a source of direct current potential and an output circuit connected across said second resistor.

7. A frequency discriminator comprising, a source of signals of known frequency, a source of signals of unknown frequency, a first mixer having impressed thereon a portion of the signals derived from said source of known frequency and said source of unknown frequency, a second mixer having impressed thereon a portion of the signals derived from said source of known frequency and said source of unknown frequency a phase shifter interposed between one of said signal sources and one of said mixers, a first amplifier coupled to the output of said first mixer, a second amplifier coupled to the output of said second mixer, means for causing the amplified beat frequency output of one of said amplifiers to alternate at a higher mean potential level than the beat frequency output of the other of said amplifiers, a pair of diodes connected in series between the outputs of said first and second amplifiers and a condenser connected between the common junction of said diodes and ground.

8. A frequency discriminator comprising, a source of signals of known frequency, a source of signals of unknown frequency, a first mixer having impressed thereon a portion of the signals derived from said source of known frequency, a second mixer having impressed thereon a portion of the signals derived from said source of known frequency and said source of unknown frequency, a phase shifter interposed between one of said signal sources and one of said mixers, a first amplifier including an unbypassed cathode resistor coupled to the output of said first mixer, a second amplifier including an unbypassed cathode resistor coupled to the output of said second mixer, means for causing the amplified beat frequency output of one of said amplifiers to alternate at a higher mean potential level than the beat frequency output of the other of said amplifiers, a pair of diodes connected in series between the cathodes of said first and second amplifiers and a condenser connected between the common junction of said diodes and ground.

9. A frequency discriminator comprising, a source of signals of known frequency, a source of signals of unknown frequency, a first mixer having impressed thereon a portion of the signals derived from said source of known frequency and said source of unknown frequency, a second mixer having impressed thereon a portion of the signals derived from said source of known frequency and said source of unknown frequency, a phase shifter interposed between one of said signal sources and one of said mixers, a first amplifier including an unbypassed cathode resistor coupled to the output of said first mixer, a second amplifier including an unbypassed cathode resistor coupled to the output of said second mixer, means for causing the amplified beat frequency output of one of said amplifiers to alternate at a higher mean potential level than the beat frequency output of the other of said amplifiers, a pair of diodes connected in series between the cathodes of said first and second amplifiers, a condenser connected between the common junction of said diodes and ground, an amplifier having its control electrode connected to the common junction of said diodes and its cathode connected through an unbypassed resistor to ground and an output connected to said last mentioned cathode.

ROBERT CRANE, Jr.

REFERENCES CITED

The following references are of record in the file of this patent:

UNITED STATES PATENTS

| Number | Name | Date |
| --- | --- | --- |
| 2,044,749 | Usselman | June 16, 1936 |
| 2,176,742 | La Pierre | Oct. 17, 1939 |
| 2,207,540 | Hansell | July 9, 1940 |
| 2,274,434 | Sheaffer | Feb. 24, 1942 |
| 2,422,386 | Anderson | June 17, 1947 |
| 2,473,853 | Boykin | June 21, 1949 |
| 2,479,817 | Curran | Aug. 23, 1949 |